United States Patent

[11] 3,612,479

| [72] | Inventor | Charles W. Smith, Jr.<br>Erie, Pa. |
|---|---|---|
| [21] | Appl. No. | 840,991 |
| [22] | Filed | July 11, 1969 |
| [45] | Patented | Oct. 12, 1971 |
| [73] | Assignee | Autoclave Engineers, Inc.<br>Erie, Pa. |

[54] DOUBLE SEAT VALVE
5 Claims, 1 Drawing Fig.

[52] U.S. Cl. ................................................. 251/176,
251/DIG. 1, 251/187, 251/189, 251/191
[51] Int. Cl. ..................................................... F16k 1/04,
F16k 3/16, F16k 31/50
[50] Field of Search............................................ 251/189,
190, 191, 351, 358, 187

[56] References Cited
UNITED STATES PATENTS

| 607,492 | 7/1898 | Thomas....................... | 251/189 X |
| 2,213,680 | 9/1940 | Share ......................... | 251/190 |
| 2,726,104 | 12/1955 | Boitnott ...................... | 251/DIG. 1 |
| 2,839,265 | 6/1958 | Hobbs.......................... | 251/191 X |
| 2,889,134 | 6/1959 | Bryant.......................... | 251/DIG. 1 |
| 3,037,521 | 6/1962 | Larry............................. | 251/189 X |
| 3,211,418 | 10/1965 | Klinger-Lohr................ | 251/187 X |
| 3,314,372 | 4/1967 | Sutton.......................... | 251/187 X |

*Primary Examiner*—Clarence R. Gordon
*Attorney*—Webb, Burden, Robinson & Webb

ABSTRACT: A double seat valve having a hard seat for metering and initial closing and a soft or plastic seat for final sealing. The valve according to this invention has a two part stem. The inner stem terminates in a closure head for cooperating with a hard seat or boot. An outer stem is positioned concentrically and slideably about the inner stem and has a flanged end and face adjacent the back or base of the closure head. An annular plastic sealing means is positioned between the base of the closure head and the flange or face of the outer valve stem. A biasing means urges the two parts of the valve stem against the plastic sealing means. During closing the outer valve stem carries the inner valve stem and closure head against the boot to form the initial seal. Thereafter, the outer valve stem moves relative to the inner valve stem deforming the plastic sealing means out against the walls of the valve body.

PATENTED OCT 12 1971 3,612,479
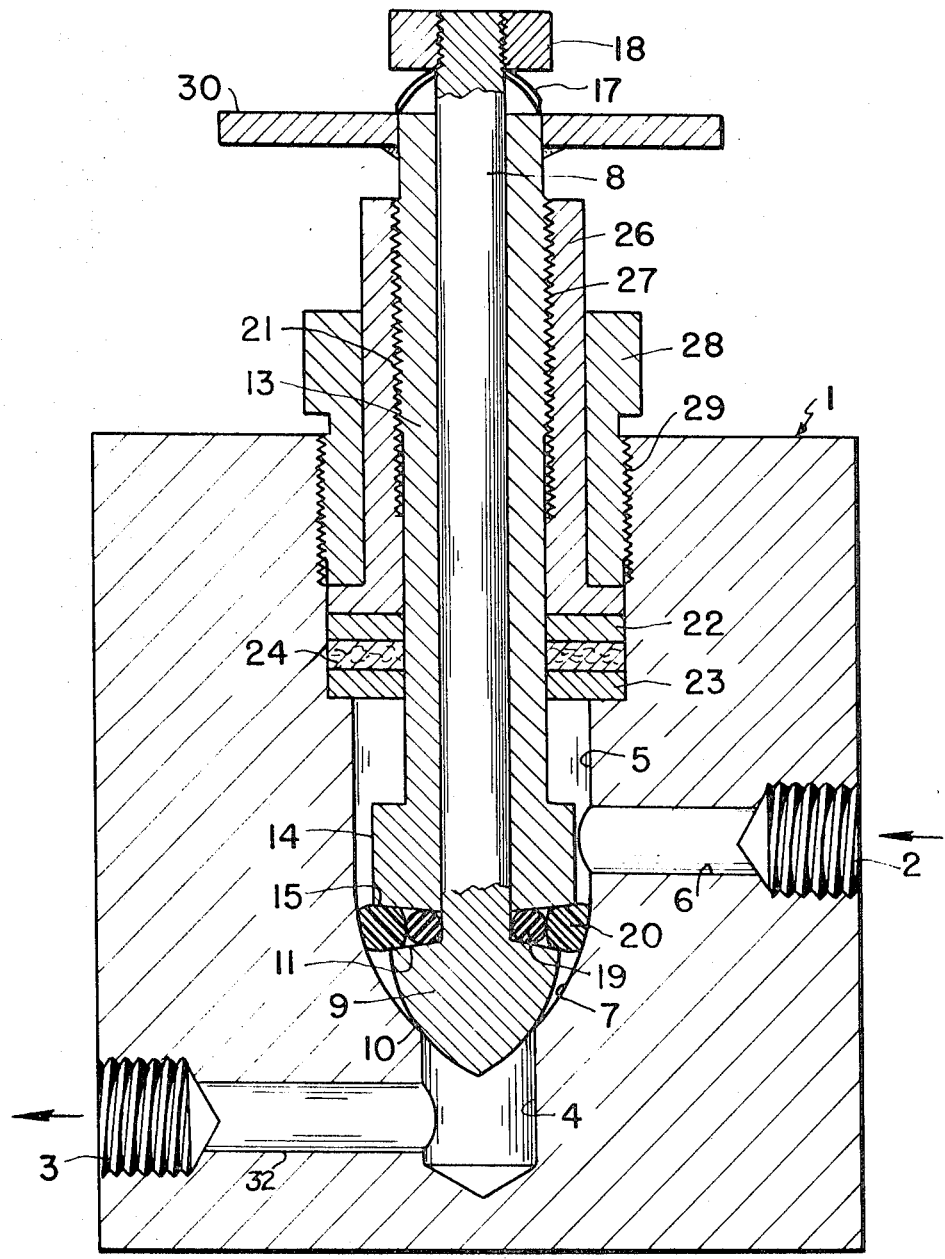
INVENTOR.
Charles W. Smith, Jr.
Webb, Burden, Robinson & Webb
HIS ATTORNEYS

DOUBLE SEAT VALVE

THE INVENTION

This invention relates to high-pressure fluid valves which operate at pressures often in excess of 15,000 p.s.i. Generally, these operating conditions can only be accommodated by valves having a soft or plastic seat or sealing means. Prior valves having a plastic sealing means have had drawbacks. In most valves having a plastic seat, the fluid rushes past the plastic seat at a very high velocity during opening and closing of the valve. In addition, the mechanical loads of closing are directed to the plastic seat at this time. This causes abrasion and wear of the plastic material and the material is rapidly worn to the point that the valve is no longer useful.

According to this invention, a valve is provided with a two-part valve stem. The inner stem terminates in a closure head having a front face for cooperating with a hard seat or boot. An outer stem is positioned concentrically and slideably about the inner stem and has a face adjacent the back face of the closure head. An annular plastic sealing means or ring is positioned concentrically about the inner stem and between the back of the closure head and the face of the outer stem. The inner and outer valve stems are biased against the plastic sealing means. This construction enables the plastic sealing means to be deformed against the valve body by relative movement of the inner and outer stems only after the hard seat has engaged the boot. In this manner, the plastic sealing means is not positioned in the direct path of the high-velocity fluids passing through the valve just before closing and just after opening. This construction has the further advantage of being extremely simple compared to prior double-seat valves and it is thereby more rugged and durable. It is an advantage of this construction that the plastic sealing means may comprise two rings of the dissimilar plasticities. It is another advantage of the invention that the high-velocity fluids at no time rush past more than one side of the annular plastic sealing means. It is yet another advantage of this invention that the wearing of the sealing means can be compensated for by more relative movement between the inner and outer valve stems. This gives the valve a reseating capability. Finally, valves constructed according to this invention use the pressure of the system to help actuate the plastic sealing means after it has been forced out into an unsupported position confronting the gas stream.

Further advantages of the double seat valve according to this invention will become apparent from the following detailed description with reference to the drawing which is a cross section through the preferred embodiment of the double seat valve of the present invention showing the valve in the seated or closed position.

Valve body 1 is provided with an inlet fitting 2 and an outlet fitting 3. Upper and lower fluid passages are defined respectively by an upper, substantially cylindrical wall 5 and a lower, substantially cylindrical wall 4 joined by a conical wall 7 which provides a valve seat for the hard valve, often referred to as the boot. An inlet passageway 6 connects the inlet fitting with the upper fluid passage. An outlet passageway 32 connects the outlet fitting with the lower fluid passage. Disposed within the upper fluid passageway is a two part valve stem. The inner stem 8 terminates in a conical head 9 having a front face 10 that is substantially conically shaped and a back face or base 11 which is substantially flat. The surface 10 need not be precisely conical and may be, for example, spherical or paraboloidal or any other workable shape. The surface 11 need not be precisely flat. Preferably, however, it should form a small angle, for example, less than 30°, with the plane that is perpendicular to the centerline of the inner stem. Positioned concentrically and slideably about the inner stem and having a face about the inner stem is the outer stem 13. Preferably, the outer stem has a flange 14 at its lower end. The outer stem has a face 15 that is substantially flat and forms a small angle, for example, less than 30°, with a plane perpendicular to its centerline of the inner stem. This face is adjacent the back face 11 of the closure head.

The plastic sealing means comprises at least one annular member which is concentric with the inner stem and rests between the face 11 of the closure head and face 15 of the outer stem. In the drawing, two annular plastic sealing members are shown as 19 and 20. The inner member 19 preferably is comprised of a rubber and the outer member 20 of a polytetrafluoroethylene plastic.

The inner and outer stems are biased against the annular plastic sealing means by a spring or lockwasher 17 and secured in place by a fastening means 18.

The outer stem is threaded over a portion of its external surface at 21. The outer stem is sealed to the walls of the passageway by a conventional packing 24 secured between two bushings 22 and 23.

The valve stem is secured in place by two cooperating sleeves 26 and 28. Outer sleeve 28 is threaded on an exterior at 29 so that it can be threadably secured to the valve body 1. The inner sleeve 26 is threaded on its interior. The threads 21 around the exterior of the outer valve stem and the threads 27 on the inner sleeve cooperate such that the valves can then be moved up and down or axially by turning the outer valve stem with handle 30. The threads 21 on the outer stem 13 are, of course, shorter than the threads 27 on the inner sleeve 26.

When sleeve 28 is turned into the valve body 1, it forces bushings 22 and 23 together against packing 24 thus insuring a good seal. The packing 24 may be any of the commonly used materials. The slight biasing of the outer valve stem 13 against the sealing member 19 and the inner valve stem 9 spreads the annular plastic member 19 thus insuring no leakage between where the valve stems join.

The operation of the device shown in the drawing just described will be clear from a brief description. When the stem 13 is rotated by turning handle 30 the outer stem moves axially carrying the inner stem 9 downward. As the closure head 9 moves toward the boot 7, the fluids passing through the valve are metered. When the closure head 9 finally reaches the boot a first seal is formed. Thereafter, turning of the outer stem moves the outer stem downward while the inner stem remains stationary. This relative movement of the two stem parts deforms the annular plastic sealing means 19 and 20 such that they are forced out against the walls of the valve body. As shown in the drawing, the sealing is against the conical section or boot which is preferable; however, it is also satisfactory if the sealing is against the upper cylindrical wall. The pressure of the fluids in the upper fluid passageway tightens the plastic seal by forcing it against the walls of the valve body. This is referred to as pressure energizing and prevents unseating of the valve during fluctuation of pressures. It should be apparent from the drawings in the foregoing description that the plastic sealing means is not forced out into the stream of high-velocity fluids until after the first seal has been established. In this way, the plastic seal which is more vulnerable to abrasion than the solid or metal seat has a longer service life. It should be also apparent that the gases only rush past an outer edge of the annular plastic seal. This is a decided improvement over prior art soft seat valves because the high-velocity gases pass both inner and outer edges of the annular seal.

A valve manufactured according to the description above in which the sealing means was the 0011 polytetrafluoroethylene Teflon O-ring was tested for sealing ability by first placing a piece of wire 0.010 inch thick on the seat. The valve was pressurized to 15,000 p.s.i. with no leakage. The valve was cycled three times and then disassembled for inspection. The wire had embedded itself in the O-ring in three places. The valve was reassembled with the wire removed. The valve was pressurized with 1,500 p.s.i. of helium with no leakage at the seat demonstrating the usual reliability of valves according to this invention.

Having thus described my invention with detail and with the particularity required by the patent laws, what is desired to have protected by Letters Patent is as follows.

In the claims:

1. A double seat valve comprising a valve body having upper and lower fluid passages defined respectively by an upper substantially cylindrical wall and a lower substantially cylindrical wall of smaller diameter, said passages joined by a tapered wall defining a valve seat, walls within the valve body defining an inlet passage in communication with the upper fluid passage and an outlet passage in communication with said lower fluid passage, an inner valve stem positioned within said upper fluid passage terminating at one end in a closure head with a front face adapted to cooperating with said valve seat and a back face with an outer diameter greater than the inner stem, said back face forming a small angle of less than 30° with the plane perpendicular to the centerline of the inner stem, an outer stem positioned concentrically and slidably about said inner stem and having a face adjacent the back face of said closure head, said adjacent face forming a small angle of less than 30° with the plane perpendicular with the centerline of the inner stem, said back face of the closure head and said adjacent face of the outer stem converging on the centerline of the inner stem, an annular plastic sealing means positioned concentrically about said inner valve stem and abutting both the end face of said outer valve stem and the back face of said closure head, said sealing means comprising an inner ring adjacent the inner stem and an outer ring concentric with the inner ring, means for biasing the inner stem and outer stem against said plastic sealing means spreading the inner ring preventing leakage where the inner and outer stems join, packing means sealing the outer surface of said outer stem and said upper cylindrical wall, said outer stem threadably engaging said valve body, whereby when said outer valve stem is turned the outer valve stem carries the inner stem or closure head to the valve seat, and when the closure head reaches the valve seat the inner stem moves relative to the outer stem deforming the plastic sealing means out against the walls of the valve body.

2. A double seat valve according to claim 1 wherein the inner ring is rubber and the outer ring is polytetrafluoroethylene plastic.

3. A double seat valve according to claim 1 wherein the plastic sealing means seals against the tapered wall.

4. A double seat valve according to claim 1 wherein the outer stem has a flanged end adjacent the back of the closure head on the inner stem.

5. A double seat valve according to claim 1 wherein the tapered wall and closure head have cooperating surfaces that are substantially conical.